(12) United States Patent
Yang

(10) Patent No.: US 9,736,768 B2
(45) Date of Patent: Aug. 15, 2017

(54) GATEWAY SELECTION METHOD AND DEVICE

(71) Applicant: CHINA ACADEMY OF TELECOMMUNICATIONS TECHNOLOGY, Beijing (CN)

(72) Inventor: Yi Yang, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 483 days.

(21) Appl. No.: 14/369,679

(22) PCT Filed: Sep. 21, 2012

(86) PCT No.: PCT/CN2012/081766
§ 371 (c)(1),
(2) Date: Jun. 27, 2014

(87) PCT Pub. No.: WO2013/097499
PCT Pub. Date: Jul. 4, 2013

(65) Prior Publication Data
US 2015/0043454 A1 Feb. 12, 2015

(30) Foreign Application Priority Data

Dec. 28, 2011 (CN) .......................... 2011 1 0448323

(51) Int. Cl.
*H04W 48/00* (2009.01)
*H04W 8/20* (2009.01)

(52) U.S. Cl.
CPC ............ *H04W 48/17* (2013.01); *H04W 8/20* (2013.01)

(58) Field of Classification Search
None
See application file for complete search history.

(56) References Cited

U.S. PATENT DOCUMENTS

2010/0281157 A1* 11/2010 Ramankutty ......... H04W 24/08
709/224
2011/0085471 A1* 4/2011 Zhang .................. H04W 16/00
370/254
(Continued)

FOREIGN PATENT DOCUMENTS

| CN | 101257705 A | 9/2008 |
|----|----|----|
| CN | 101262269 A | 9/2008 |
| CN | 102088757 A | 6/2011 |

OTHER PUBLICATIONS

PCT International Search Report for PCT Counterpart Application No, PCT/CN2012/081766, 5 pgs., (Dec. 27, 2012).

(Continued)

*Primary Examiner* — Alex Skripnikov
(74) *Attorney, Agent, or Firm* — Blakely, Sokoloff, Taylor & Zafman LLP

(57) ABSTRACT

The present invention relates to the technical field of wireless communications. Disclosed are a gateway selection method and device, which are used to solve the problem of how to select a packet data gateway (PGW) for a mobile relay node (RN). In the present invention, a mobility management entity (MME) receives an initial UE message carrying identity indication information of the RN and sent by a donor base station DeNB; acquiring subscription data of the RN from a home subscriber server (HSS); the MME determining, according to the identity indication information and/or subscription data of the RN, whether the RN is a mobile RN, and if the determination is yes, selecting a PGW located in a core network as the PGW of the RN. By means of the present invention, the problem of how to select the PGW for the mobile RN is solved.

11 Claims, 8 Drawing Sheets

(56) References Cited

U.S. PATENT DOCUMENTS

| | | | | |
|---|---|---|---|---|
| 2012/0320817 A1* | 12/2012 | Xu | .................... | H04W 8/08 |
| | | | | 370/315 |
| 2013/0183971 A1* | 7/2013 | Tamaki | ............. | H04W 36/0061 |
| | | | | 455/436 |
| 2015/0296424 A1* | 10/2015 | Xu | .................... | H04W 36/0033 |
| | | | | 370/331 |

OTHER PUBLICATIONS

European Patent Office Communication enclosing Extended European Search Report for corresponding European Patent Application No. 12863312.0, 10 pp., (Feb. 12, 2015).

CMCC, et al., "Relay Attach Procedure", 3GPP TSG RAN WG3 Meeting #66bis, R3-100314, Valencia, Spain, 5 pp., (Jan. 18-22, 2010).

Motorola, et al., "GW Selection for RN", 3GPP TSG RAN WG3 #69bis Meeting, R3-102598, Xi'an, P.R. China, 6 pp., (Oct. 11-15, 2010).

NEC, "Signaling the RN Indication to DeNB", 3GPP TSG-RAN WG3#68, R3-101578, Montreal, Canada, 2 pp., (May 10-14, 2010).

New Postcom, "Consideration of Architectural Aspect on Mobile RN", 3GPP TSG RAN WG3 Meeting #73bis, R3-112503, Zhuhai, China, 3 pp., (Oct. 10-14, 2011).

Huawei, "Issues on NAS Nodes Selection in Relay Scenario", , 3GPP TSG RAN WG3 #68 Meeting, R3-101411, Montreal, Canada, 3 pp., (May 10-14, 2010).

PCT Written Opinion of the International Search Authority for PCT Counterpart Application No. PCT/CN2012/081766, 12 pp., (Dec. 27, 2012).

PCT Notification Concerning Transmittal of International Preliminary Report on Patentability (Chapter I of the Patent Cooperation Treaty) for PCT Counterpart Application No. PCT/CN2012/081766, 15 pp., (Jul. 10, 2014).

* cited by examiner

GATEWAY SELECTION METHOD AND DEVICE

CROSS-REFERENCE TO RELATED APPLICATIONS

The present application is a U.S. National Stage under 35 U.S.C. §371 of International Application No. PCT/CN2012/081766 filed on Sep. 21, 2012 entitled GATEWAY SELECTION METHOD AND DEVICE, designating the United States, and claiming the benefit of Chinese Patent Application No. 201110448323.3, filed with the Chinese Patent Office on Dec. 28, 2011 and entitled "Gateway selection method and device", which was incorporated by reference in its entirety.

FIELD

The present invention relates to the field of wireless communications and particularly to a gateway selection method and device.

BACKGROUND

In the prior art, in order to address the cost and coverage issues of network deployment, various manufacturers and standardization organizations have introduced a Relay Node (RN) to a cellular system to extend the coverage. The RN in the prior art is referred to as a fixed relay node which does not support mobility. FIG. 1 is a network architecture of a Long Term Evolution-Advanced (LTE-A) system with an RN deployment, where the RN is connected to a core network via a donor cell served by a Donor evolved Node B (DeNB). There is no direct wired interface between the RN and the core network. Each RN can control one or more cells. In this architecture, an interface between a User Equipment (UE) and the RN is referred to as a Uu interface, and an interface between the RN and the DeNB is referred to as a Un interface. The DeNB is integrated with part of functions of a Packet Data Network Gateway (PGW) and a Serving Gateway (SGW).

The RN has a dual-identity as a UE and an evolved Node B (eNB). As described in the protocol 3GPP TS 36.300, the RN is started in a process which can be described in two phases: in a first phase, the RN access to any evolved Node B as a UE, registered with the network, accesses an RN Operation and Maintenance (OAM) system and downloads a list of accessible Donor evolved Node B (DeNB) cells, and then the RN is deregistered with the network; and in a second phase, the RN selects one of the accessible DeNB cells and establishes a Radio Resource Control (RRC) connection with the DeNB. The DeNB selects an appropriate Mobility Management Entity (MME) for the UE, and the MME selects the DeNB as an SGW and a PGW of the RN. The DeNB establishes a default bearer and necessary dedicated bearer for the RN, and then the OAM downloads node configuration information to the RN and configures the RN. The RN can operate normally as an evolved Node B after establishing necessary S1 and X2 interfaces.

In the first phase, the eNB and the MME serving the RN can be legacy nodes, that is, they may not support the RN. In the second phase, the evolved Node B and the MME, which are accessed by the RN, must support the RN. Moreover in this phase, the DeNB sends IP addresses of the embedded PGW and the SGW to the MME, and the MME selects the DeNB as the PGW and the SGW of the RN according to the received IP addresses and establishes the necessary interfaces thereto.

In the process of starting the RN, subscription data of the RN sent from a Home Subscriber Server (HSS) to the MME includes information indicating that the subscription data is for the RN and a special Access Point Name (APN) referring to the PGW for connection with the OAM. In the first phase, the MME uses the special APN to select the PGW accessible to the OAM so that the RN accesses the OAM and downloads the initial configuration information. In the second phase, the MME receives RN indication information sent from the DeNB and thus ignores the APN information in the subscription data and selects the PGW and the SGW using the IP addresses of the PGW and the SGW reported from the DeNB.

In order to address the problems of a poor signal coverage, frequent handovers, etc., in a high-speed mobile environment, a relay node supporting mobility, i.e., a mobile RN, can be deployed on a vehicle body moving at a high speed to enhance a signal quality inside the vehicle body, and the number of handover and location update can be decreased by a group handover.

FIG. 2 is a schematic diagram of a node relationship for an RN applicable to a high-speed mobile environment. Firstly the RN accesses to the network like a UE, and the network establishes an Evolved Packet System (EPS) bearer for the RN. The RN accesses an OAM and downloads necessary configuration data. Then the RN establishes necessary interfaces with a core network and configures Uu interface parameters to thereby become an evolved Node B. From the perspective of a UE, the RN is a serving evolved Node B of the UE. When the UE accesses the RN, all the data of the UE is mapped onto a bearer of the RN and transferred to a next-hop node through a PGW of the RN.

It shall be noted that the DeNB deployed in the high-speed mobile scenario may not be provided with the functions of the PGW and the SGW of the RN.

The inventors have identified during making of the invention the following technical problems in the prior art:

in the second phase of starting the RN, the MME selects the DeNB as the PGW and the SGW of the RN according to the IP addresses of the PGW and the SGW reported from the DeNB. However the DeNB deployed in the high-speed mobile scenario may not be integrated with the functions of the SGW/PGW of the mobile RN, and it is very likely that the PGW of the mobile RN is located in the core network, so the DeNB is typically not aware of the IP address of the SGW/PGW, and consequently it is not feasible to select the PGW and the SGW for the mobile RN still in the mechanism to report the IP address of the gateway from the DeNB in the prior art.

SUMMARY

Embodiments of the invention provide a gateway selection method and device so as to address the issue of how to select a PGW for a mobile RN.

A method of selecting a gateway includes:

an MME receiving an Initial UE message carrying identity indication information of an RN, sent from a Donor evolved Node B, DeNB, and acquiring subscription data of the RN from an HSS; and the MME determining whether the RN is a mobile RN according to the identity indication information and/or the subscription data of the RN, and selecting a PGW of a core network as the PGW of the RN upon determining that the RN is a mobile RN.

A method of indicating an identity includes:

a mobile RN establishing an RN connection with a DeNB upon entry into a second phase of startup; and the mobile RN sending to the DeNB identity indication information indicating the mobile RN as an RN or a mobile RN in the course of establishing the RRC connection.

A method of forwarding an identity indicator includes:

a DeNB receiving identity indication information, sent from a mobile Relay Node, RN, indicating the mobile RN as an RN or a mobile RN in the course of establishing an RRC connection with the mobile RN; and the DeNB sending an Initial UE message, carrying the identity indication information, to an MME.

A method of sending subscription data includes:

an HSS receiving a Locate Update Request sent from an MME; and the HSS returning subscription data of a mobile Relay Node, RN, to the MME, wherein the subscription data includes mobile RN indication information and/or an Access Point Name, APN, referring to PGWs enabling an RN to operate normally as an evolved Node B.

An MME includes:

a reception component configured to acquire an Initial UE message, carrying identity indication information of an RN, sent from a DeNB;

an obtainment component configured to acquire subscription data of the RN from an HSS;

a determination component configured to determine whether the RN is a mobile RN according to the identity indication information and/or the subscription data of the RN; and a selection component configured to select a PGW of a core network as the PGW of the RN when it is determined that the RN is a mobile RN.

A mobile RN includes:

an establishment component configured to establish an RRC connection with a DeNB upon entry into a second phase of startup; and an indication component configured to send to the DeNB identity indication information indicating the mobile RN as an RN or a mobile RN in the course of establishing an RRC connection.

A DeNB includes:

a reception component configured to receive identity indication information, sent from a mobile Relay Node, RN, indicating the mobile RN as an RN or a mobile RN in the course of establishing an RRC connection with the mobile RN; and a sending component configured to send an Initial UE message, carrying the identity indication information, to an MME.

An HSS includes:

a reception component configured to receive a Locate Update Request sent from an MME; and a response component configured to return subscription data of a mobile RN, to the MME, wherein the subscription data includes mobile RN indication information and/or an Access Point Name, APN, referring to, PGWs enabling an RN to operate normally as an evolved Node B.

In these solutions, a mobile RN establishes an RRC connection with a DeNB upon entry into a second phase of startup and sends to the DeNB identity indication information indicating the mobile RN as an RN or a mobile RN in the course of establishing the RRC connection; the DeNB sends an Initial UE message, carrying the identity indication information, to an MME upon reception of the identity indication information, sent from the mobile RN, indicating the mobile RN as an RN or a mobile RN; and the MME acquires subscription data from an HSS upon reception of the Initial UE message sent from the DeNB, determines whether the RN is a mobile RN according to the identity indication information and/or the subscription data, and if so, then the MME selects a PGW of a core network as a PGW of the RN. Apparently the inventive method enables a solution to selecting a PGW for a mobile RN to thereby address the issue of how to select a PGW for a mobile RN.

DETAILED DESCRIPTION

In order to address the issue of how to select a PGW for a mobile RN at the network side, embodiments of the invention provides for a mobile RN a method of indicating an identity, provides for a DeNB a method of forwarding an identity, provides for an HSS a method of sending subscription data and provides for an MME a method of selecting a gateway, which will be described below respectively.

Figure 1:
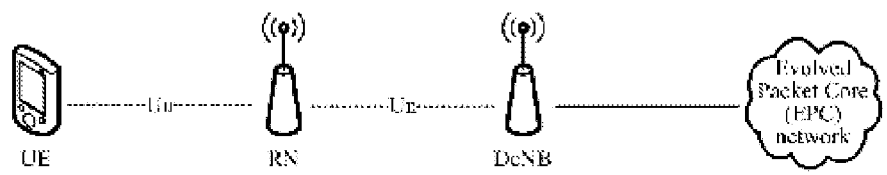
FIG. 1 is a structural diagram of an E-UTRAN network including an RN in the prior art.
Figure 2:
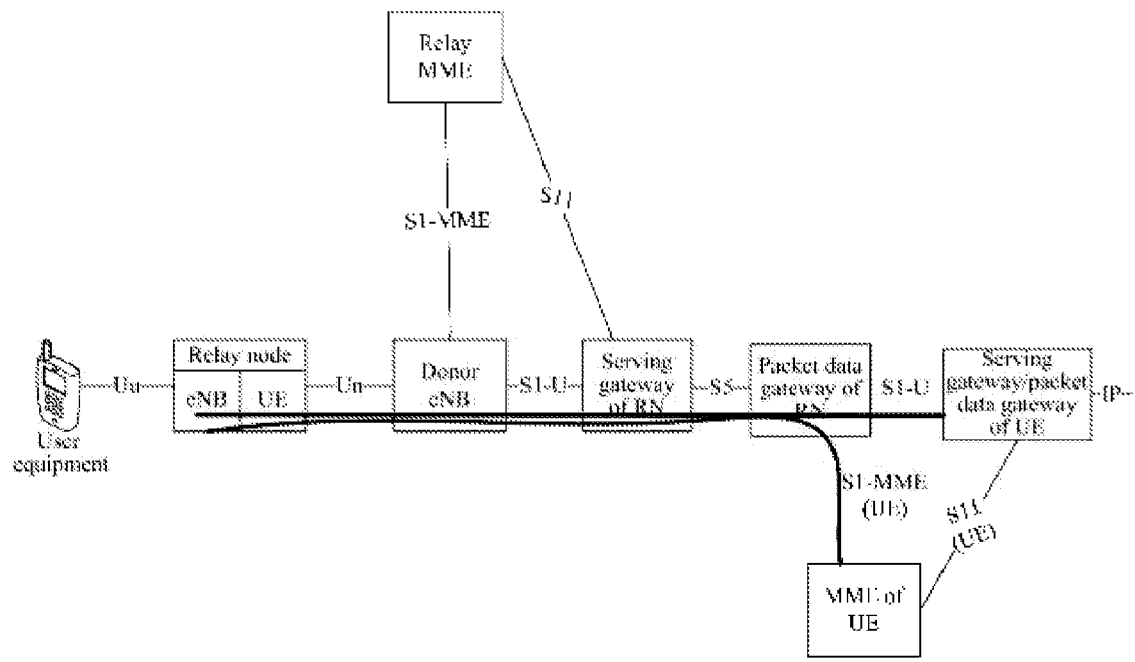
FIG. 2 is a node relationship diagram for a mobile RN in the prior art.
Figure 3:
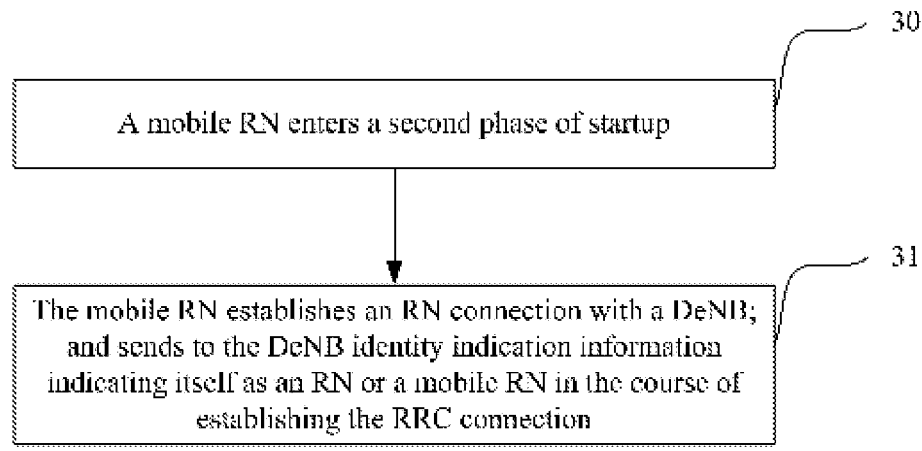
FIG. 3 is a schematic flow chart of a method according to an embodiment of the invention.

Referring to FIG. 3, a method of indicating an identity according to an embodiment of the invention includes the following steps:

Step 30: A mobile RN enters a second phase of startup; and

Step 31: The mobile RN establishes an RRC connection with a DeNB; and sends to the DeNB identity indication information indicating the mobile RN as an RN or a mobile RN in the course of establishing the RRC connection.

In the step 31, the mobile RN can send to the DeNB the identity indication information indicating the mobile RN as an RN or a mobile RN in an RRC Setup Complete message, that is, the identity indication information is carried in the RRC Setup Complete message.

Preferably after the mobile RN establishes the RRC connection with the DeNB, the mobile RN can download from an Operation and Maintenance (OAM) system an APN referring to PGWs enabling an RN to operate normally as an evolved Node B; and can a locally preconfigured APN referring to PGWs enabling an RN to operate normally as an evolved Node B. Correspondingly the mobile RN sends the APN to the DeNB while the mobile RN sending the identity indication information indicating itself as an RN or a mobile RN to the DeNB. Specifically the mobile RN sends the APN to the DeNB in a Non Access Stratum (NAS) message in the RRC Setup Complete message, that is, the APN is carried in the NAS message in the RRC Setup Complete message.

Figure 4:
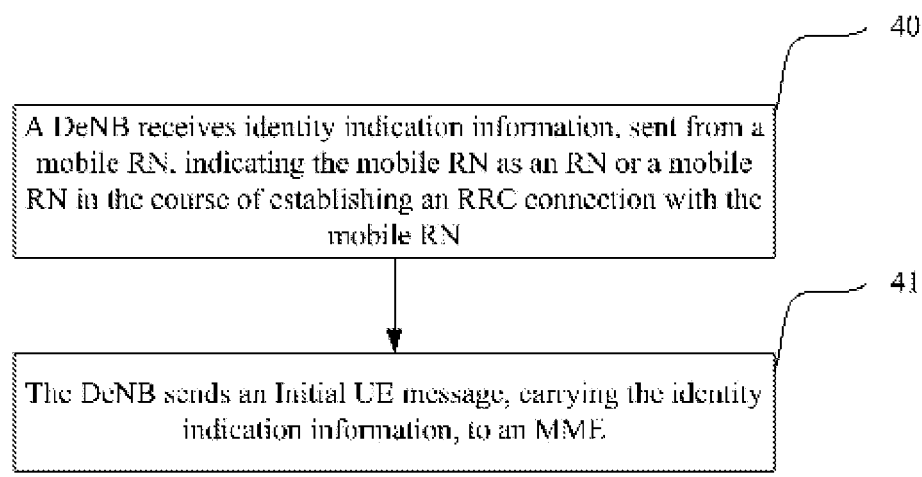
FIG. 4 is a schematic flow chart of another method according to an embodiment of the invention.

Referring to FIG. 4, a method of forwarding an identity indicator according to an embodiment of the invention includes the following steps:

Step 40: A DeNB receives identity indication information, sent from a mobile RN, indicating itself as an RN or a mobile RN in the course of establishing an RRC connection with the mobile RN; and Step 41: The DeNB sends an Initial UE message, carrying the identity indication information, to an MME.

In the step 40, the DeNB can receive the identity indication information sent from the mobile RN in an RRC Setup Complete message, that is, the identity indication information is carried in the RRC Setup Complete message.

Preferably the DeNB also receive an NAS message, carrying an APN, sent from the mobile RN along with the identity indication information sent from the mobile RN; and correspondingly the NAS message is carried in the Initial UE message.

Figure 5:
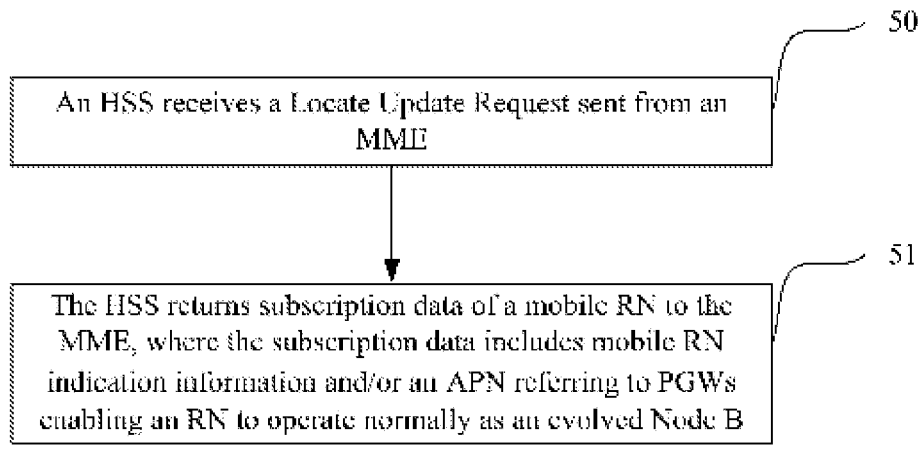
FIG. 5 is a schematic flow chart of a further method according to an embodiment of the invention.

Referring to FIG. 5, a method of sending subscription data according to an embodiment of the invention includes the following steps:

Step 50: An HSS receives a Locate Update Request sent from an MME; and

Step 51: The HSS returns subscription data of a mobile RN to the MME, where the subscription data includes mobile RN indication information and/or an APN referring to PGWs enabling an RN to operate normally as an evolved Node B.

In the step 51, the subscription data can further include an APN referring to PGWs for connection with an OAM, and then the APN referring to PGWs enabling an RN to operate normally as an evolved Node B is provided with a specific flag indicating that the APN with the flag is used to select PGWs enabling an RN to operate normally as an evolved Node B. Alternatively the APN referring to PGWs for connection with an OAM is provided with a specific flag indicating that the APN with the flag is used to select PGWs in connection with an OAM.

Figure 6:
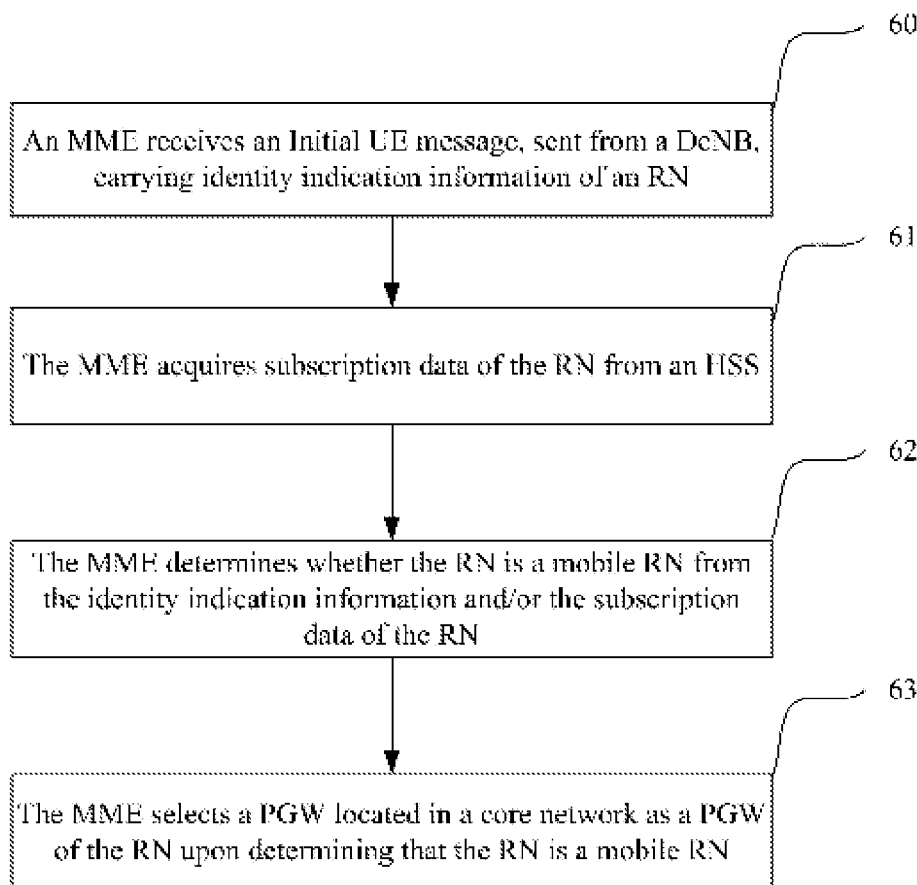
FIG. 6 is a schematic flow chart of still another method according to an embodiment of the invention.

As illustrated in FIG. 6, a method of selecting a gateway according to an embodiment of the invention includes the following steps:

Step 60: An MME receives an Initial UE message, sent from a DeNB, carrying identity indication information of an RN;

Step 61: The MME acquires subscription data of the RN from an HSS;

Step 62: The MME determines whether the RN is a mobile RN from the identity indication information and/or the subscription data of the RN; and Step 63: The MME selects a PGW located in a core network as a PGW of the RN upon determining that the RN is a mobile RN.

In the step 62, the MME can determine whether the RN is a mobile RN from the identity indication information of the RN particularly as follows:

the MME judges whether the identity indication information of the RN indicates that the RN is a mobile RN, and if so, then the MME judges that the RN is a mobile RN; otherwise, the MME determines that the RN is a fixed RN and selects a PGW and an SGW for the fixed RN as in the prior art when the RN is a fixed RN.

In the step 62, the MME can determine whether the RN is a mobile RN from the identity indication information and the subscription data of the RN particularly as follows:

The MME judges whether the identity indication information of the RN indicates that the RN is a mobile RN and whether there is mobile RN indication information in the subscription data, and if both results of the judging are positive, then the MME judges that the RN is a mobile RN; otherwise, the MME determines that the RN is a fixed RN and selects a PGW and an SGW for the fixed RN as in the prior art when the RN is a fixed RN.

In the step 62, the MME can determine whether the RN is a mobile RN from the subscription data of the RN particularly as follows:

The MME judges whether there is mobile RN indication information in the subscription data, and if so, then the MME judges that the RN is a mobile RN; otherwise, the MME determines that the RN is a fixed RN.

In the step 63, the MME can select a PGW of a core network as a PGW of the RN particularly as follows:

the MME selects a PGW of a core network as a PGW of the RN according to an APN in the subscription data or local pre-configuration information or an APN reported from the RN.

Specifically the MME can select a PGW of a core network as a PGW of the RN according to an APN in the subscription data particularly as follows:

When there are two APNs in the subscription data, the MME selects one with a specific flag from the two APNs, inquires a Domain Name System (DNS) server for information about PGWs according to the selected APN and selects one of the found PGWs as the PGW of the RN, where the specific flag indicates that the APN with the flag is used to select PGWs enabling an RN to operate normally as an evolved Node B; or When there are two APNs in the subscription data, the MME selects one without a specific flag from the two APNs, inquires a DNS server for PGWs according to the selected APN and selects one of the found PGWs as the PGW of the RN, where the specific flag indicates that the APN with the flag is used to select PGWs in connection with an OAM; or When there is one APN in the subscription data, the MME inquires a DNS server for information about PGWs according to the APN and selects one of the found PGWs as a PGW of the RN.

The MME can select a PGW of a core network as a PGW of the RN according to the local pre-configuration information particularly as follows:

When there is an APN referring to PGWs enabling an RN to operate normally as an evolved Node B in the local pre-configuration information, the MME inquires a DNS server for the PGWs according to the APN and selects one of the PGWs as the PGW of the RN; or When there an IP address of a PGW enabling an RN to operate normally as an evolved Node B in the local pre-configuration information, the MME selects the PGW with the IP address as the PGW of the RN.

The MME can select a PGW of a core network as a PGW of the RN according to an APN reported from the RN particularly as follows:

when the APN reported from the RN is carried in an NAS message in the Initial UE message, the MME acquires the APN in the NAS message, inquires a DNS server for information about PGWs according to the APN and selects one of the found PGWs as a PGW of the RN.

Preferably the MME can further select an SGW at a shorter distance and lightly loaded for the RN according to the geographical location where the RN currently resides and load conditions of respective SGWs upon determining that the RN is a mobile RN.

The invention will be described below in connection with particular embodiments thereof:

First Embodiment

Figure 7A:
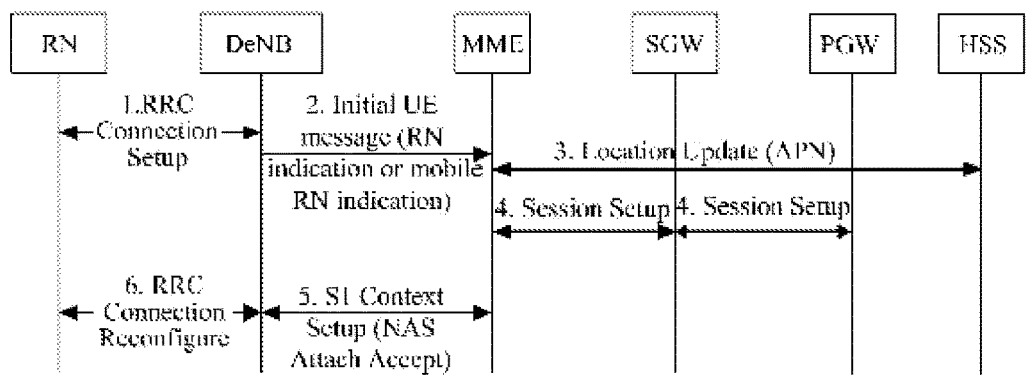
FIG. 7A is a schematic flow chart of a first embodiment of the invention.

In this embodiment, an MME determines whether a mobile RN is a fixed RN or a mobile RN according to subscription data and selects a PGW according to the subscription data, and as illustrated in FIG. 7A:

Step 1: A mobile RN sends to a DeNB identity indication information indicating the mobile RN as an RN or a mobile RN in the course of establishing an RRC connection.

When the mobile RN notifies the DeNB that the mobile RN is a mobile RN, the identity indication information indicating that the mobile RN is a mobile RN can be carried in an RRC Setup Complete message.

When the mobile RN notifies the DeNB that the mobile RN is an RN, RN identity indication information carried in an existing RRC Connection Setup Complete message can be reused.

Step 2: The DeNB sends the identity indication information to an MME in an Initial UE message upon reception of the identity indication information in the course of establishing the RRC connection.

Step 3: The MME initiates a Locate Update procedure to an HSS, and the HSS sends subscription data of the mobile RN to the MME, where there is mobile RN indication information in the subscription data; and the subscription data further includes two APNs: one of the APNs is used to select PGWs in connection with an OAM; and the other APN is used to select PGWs enabling an RN to operate normally as an evolved Node B; or the subscription data includes one APN, and a PGW corresponding to the APN can be both a PGW enabling an RN to operate normally as an evolved Node B and a PGW enabling an RN to access an OAM.

When there are two APNs in the subscription data, the APN used to select a PGW enabling an RN to operate normally as an evolved Node B is provided with a specific flag indicating that the APN is used to select PGWs enabling an RN to operate normally as an evolved Node B; or the APN used to select a PGW for connection with an OAM is provided with a specific flag indicating that the APN with the flag is used to select PGWs in connection with an OAM.

Step 4: The MME knows that the current RN is a mobile RN from the mobile RN indication information in the subscription data and selects a PGW for the mobile RN according to the APN with or without the specific flag in the subscription data (i.e., the APN used to select a PGW enabling an RN to operate normally as an evolved Node B). The MME can select an SGW for the mobile RN as in the mechanism to select an SGW for a UE in the prior art; the MME sends an IP address of the selected PGW and other information to the SGW in a Session Setup procedure; and the SGW performs a Session Setup procedure with the PGW.

In this step, if the MME receives an IP address of a PGW reported from the DeNB, then the MME ignores the IP address.

Step 5: The MME accepts an Attach request of the mobile RN and sends an S1 Context Setup Request to the DeNB.

Step 6: The DeNB establishes an air interface bearer with the RN in an RRC Connection Reconfigure process.

Second Embodiment

Figure 7B:
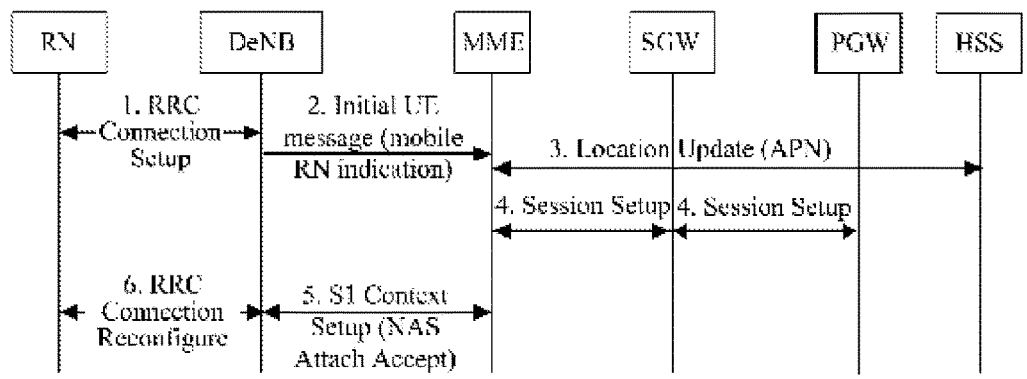
FIG. 7B is a schematic flow chart of a second embodiment of the invention.

In this embodiment, an MME determines whether a mobile RN is a fixed RN or a mobile RN according to identity indication information sent from the mobile RN and selects a PGW according to subscription data, and as illustrated in FIG. 7B:

Step 1: A mobile RN sends to a DeNB identity indication information indicating the mobile RN as an RN or a mobile RN in the course of establishing an RRC connection.

The identity indication information indicating that the mobile RN is a mobile RN can be carried in an RRC Setup Complete message.

Step 2: The DeNB sends the identity indication information to an MME in an Initial UE message upon reception of the identity indication information in the course of establishing the RRC connection.

Step 3: The MME initiates a Locate Update procedure to an HSS, and the HSS sends subscription data of the mobile RN to the MME, where there is RN indication information in the subscription data; and the subscription data further includes two APNs: one of the APNs is used to select PGWs in connection with an OAM; and the other APN is used to select PGWs enabling an RN to operate normally as an evolved Node B; or the subscription data includes one APN, and a PGW corresponding to the APN can be both a PGW enabling an RN to operate normally as an evolved Node B and a PGW enabling an RN to access an OAM.

When there are two APNs in the subscription data, the APN used to select a PGW enabling an RN to operate normally as an evolved Node B is provided with a specific flag indicating that the APN is used to select PGWs enabling an RN to operate normally as an evolved Node B; or the APN used to select a PGW for connection with an OAM is provided with a specific flag indicating that the APN with the flag is used to select PGWs in connection with an OAM.

Step 4: The MME knows that the current device is an RN from the RN indication information in the subscription data and determines that the RN is a mobile RN according to the identity indication information sent from the DeNB and then selects a PGW for the mobile RN according to the APN with or without the specific flag in the subscription data (i.e., the APN used to select a PGW enabling an RN to operate normally as an evolved Node B). The MME can select an SGW for the mobile RN as in the mechanism to select an SGW for a UE in the prior art; the MME sends an IP address of the selected PGW and other information to the SGW in a Session Setup procedure; and the SGW performs a Session Setup procedure with the PGW.

Step 5: The MME accepts an Attach request of the mobile RN and sends an 51 Context Setup Request to the DeNB.

Step 6: The DeNB establishes an air interface bearer with the RN in an RRC Connection Reconfigure process.

Third Embodiment

Figure 7C:
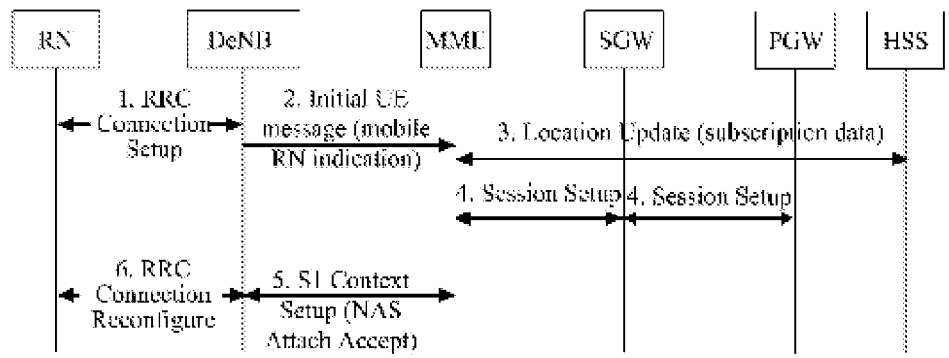
FIG. 7C is a schematic flow chart of a third embodiment of the invention.

In this embodiment, an MME determines whether a mobile RN is a fixed RN or a mobile RN according to identity indication information sent from the mobile RN and selects a PGW according to local pre-configuration information, and as illustrated in FIG. 7C:

Step 1: A mobile RN sends to a DeNB identity indication information indicating the mobile RN as an RN or a mobile RN in the course of establishing an RRC connection.

When the mobile RN notifies the DeNB that the mobile RN is a mobile RN, the identity indication information indicating that the mobile RN is a mobile RN can be carried in an RRC Setup Complete message.

Step 2: The DeNB sends the identity indication information to an MME in an Initial UE message upon reception of the identity indication information in the course of establishing the RRC connection.

Step 3: The MME initiates a Locate Update procedure to an HSS, and the HSS sends subscription data of the mobile RN to the MME, where there is RN indication information in the subscription data; and the subscription data further includes one APN used to select a PGW for connection with an OAM.

Step 4: The MME knows that the current device is an RN from the RN indication information in the subscription data and determines that the RN is a mobile RN according to local pre-configuration information and then selects a PGW for the mobile RN according to the local pre-configuration information. The MME can select an SGW for the mobile RN as in the mechanism to select an SGW for a UE in the prior art; the MME sends an IP address of the selected PGW and other information to the SGW in a Session Setup procedure; and the SGW performs a Session Setup procedure with the PGW.

The local pre-configuration information includes APN information of PGWs, information about an IP address of a PGW which can be a mobile RN, etc.

Step 5: The MME accepts an Attach request of the mobile RN and sends an 51 Context Setup Request to the DeNB.

Step 6: The DeNB establishes an air interface bearer with the RN in an RRC Connection Reconfigure process.

Fourth Embodiment

Figure 7D:
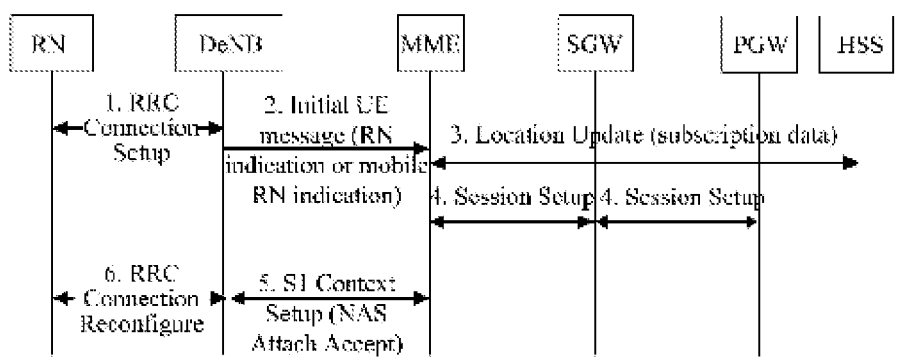
FIG. 7D is a schematic flow chart of a fourth embodiment of the invention.

In this embodiment, an MME determines whether a mobile RN is a fixed RN or a mobile RN according to subscription data and selects a PGW according to local pre-configuration information, and as illustrated in FIG. 7D:

Step 1: A mobile RN sends to a DeNB identity indication information indicating the mobile RN as an RN or a mobile RN in the course of establishing an RRC connection.

When the mobile RN notifies the DeNB that the mobile RN is a mobile RN, the identity indication information indicating that the mobile RN is a mobile RN can be carried in an RRC Setup Complete message.

When the mobile RN notifies the DeNB that the mobile RN is an RN, RN identity indication information carried in an existing RRC Connection Setup Complete message can be reused.

Step 2: The DeNB sends the identity indication information to an MME in an Initial UE message upon reception of the identity indication information in the course of establishing the RRC connection.

Step 3: The MME initiates a Locate Update procedure to an HSS, and the HSS sends subscription data of the mobile RN to the MME, where there is mobile RN indication information in the subscription data; and the subscription data further includes one APN used to select a PGW for connection with an OAM.

Step 4: The MME knows that the current RN is a mobile RN from the mobile RN indication information in the subscription data and selects a PGW for the mobile RN according to the local pre-configuration information. The MME can select an SGW for the mobile RN as in the mechanism to select an SGW for a UE in the prior art; the MME sends an IP address of the selected PGW and other information to the SGW in a Session Setup procedure; and the SGW performs a Session Setup procedure with the PGW.

The local pre-configuration information includes APN information of PGWs, information about an IP address of a PGW which can be a mobile RN, etc.

Step 5: The MME accepts an Attach request of the mobile RN and sends an 51 Context Setup Request to the DeNB.

Step 6: The DeNB establishes an air interface bearer with the RN in an RRC Connection Reconfigure process.

Fifth Embodiment

Figure 7E:
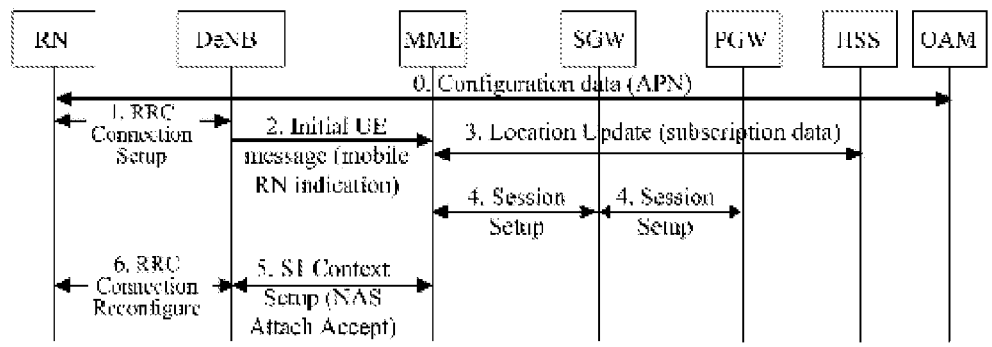
FIG. 7E is a schematic flow chart of a fifth embodiment of the invention.

In this embodiment, an MME determines whether a mobile RN is a fixed RN or a mobile RN according to identity indication information sent from the mobile RN and selects a PGW according to an APN in an NAS message, and as illustrated in FIG. 7E:

Step 0: A mobile RN downloads, from OAM, APN information referring to PGWs enabling an RN to operate normally as an evolved Node B or acquires locally preconfigured APN information referring to PGWs enabling an RN to operate normally as an evolved Node B.

The mobile RN can download the APN information from the OAM in a first phase of startup.

Step 1: The mobile RN sends to a DeNB identity indication information indicating the mobile RN as an RN or a mobile RN in the course of establishing an RRC connection.

The identity indication information indicating that the mobile RN is a mobile RN can be carried in an RRC Setup Complete message, and the APN information can be carried in an NAS message of the RRC Setup Complete message.

Step 2: The DeNB sends the identity indication information, and the NAS message, carrying the APN information, to an MME in an Initial UE message upon reception of the identity indication information and the NAS message carrying the APN information in the course of establishing the RRC connection.

Step 3: The MME initiates a Locate Update procedure to an HSS, and the HSS sends subscription data of the mobile RN to the MME, where there is RN indication information in the subscription data; and the subscription data further includes one APN used to select a PGW for connection with an OAM.

Step 4: The MME knows that the current device is an RN from the RN indication information in the subscription data and determines that the RN is a mobile RN according to the identity indication information sent from the DeNB and then selects a PGW for the mobile RN according to the APN carried in the NAS message. The MME can select an SGW for the mobile RN as in the mechanism to select an SGW for a UE in the prior art; the MME sends an IP address of the selected PGW and other information to the SGW in a Session Setup procedure; and the SGW performs a Session Setup procedure with the PGW.

Step 5: The MME accepts an Attach request of the mobile RN and sends an S1 Context Setup Request to the DeNB.

Step 6: The DeNB establishes an air interface bearer with the RN in an RRC Connection Reconfigure process.

Sixth Embodiment

Figure 7F:
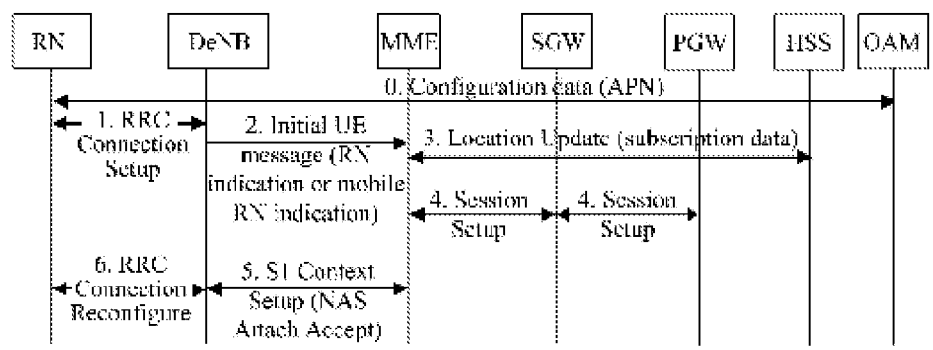
FIG. 7F is a schematic flow chart of a sixth embodiment of the invention.

In this embodiment, an MME determines whether a mobile RN is a fixed RN or a mobile RN according to subscription data and selects a PGW according to an APN in an NAS message, and as illustrated in FIG. 7F:

Step 0: A mobile RN downloads, from OAM, APN information referring to PGWs enabling an RN to operate normally as an evolved Node B or acquires locally preconfigured APN information referring to PGWs enabling an RN to operate normally as an evolved Node B.

The mobile RN can download the APN information from the OAM in a first phase of startup.

Step 1: The mobile RN sends to a DeNB identity indication information indicating the mobile RN as an RN or a mobile RN in the course of establishing an RRC connection.

When the mobile RN notifies the DeNB that the mobile RN is a mobile RN, the identity indication information indicating that the mobile RN is a mobile RN can be carried in an RRC Setup Complete message, and the APN information can be carried in an NAS message of the RRC Setup Complete message.

When the mobile RN notifies the DeNB that the mobile RN is an RN, RN identity indication information carried in an existing RRC Connection Setup Complete message can be reused, and the APN information can be carried in an NAS message of an RRC Setup Complete message.

Step 2: The DeNB sends the identity indication information, and the NAS message, carrying the APN information, to an MME in an Initial UE message upon reception of the identity indication information and the NAS message in the course of establishing the RRC connection.

Step 3: The MME initiates a Locate Update procedure to an HSS, and the HSS sends subscription data of the mobile RN to the MME, where there is mobile RN indication information in the subscription data; and the subscription data further includes one APN used to select a PGW for connection with an OAM.

Step 4: The MME knows that the current RN is a mobile RN from the mobile RN indication information in the subscription data and selects a PGW for the mobile RN according to the APN carried in the NAS message. The MME can select an SGW for the mobile RN as in the mechanism to select an SGW for a UE in the prior art; the MME sends an IP address of the selected PGW and other information to the SGW in a Session Setup procedure; and the SGW performs a Session Setup procedure with the PGW.

Step 5: The MME accepts an Attach request of the mobile RN and sends an S1 Context Setup Request to the DeNB.

Step 6: The DeNB establishes an air interface bearer with the RN in an RRC Connection Reconfigure process.

Figure 8:
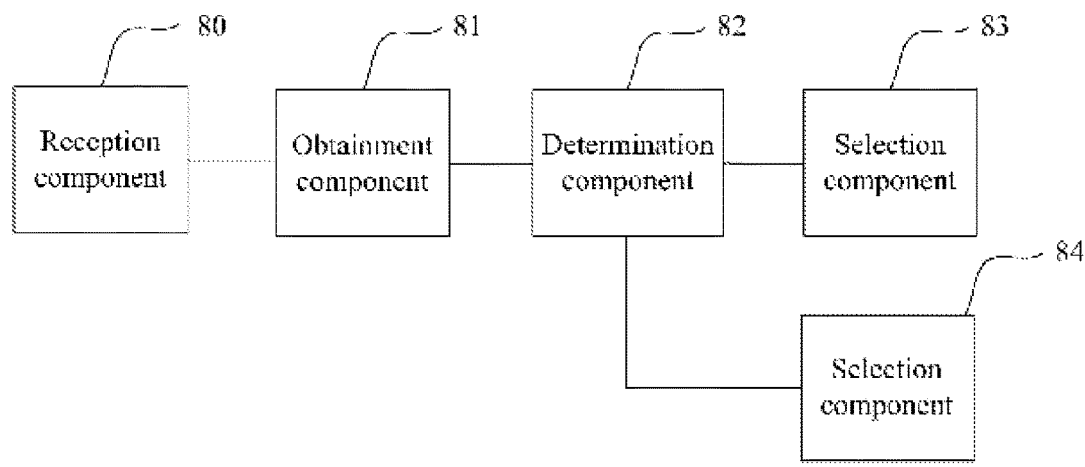
FIG. 8 is a schematic structural diagram of an apparatus according to an embodiment of the invention.

Referring to FIG. 8, an embodiment of the invention further provides an MME including:

a reception component 801 is configured to receive an Initial UE message, carrying identity indication information of an RN, sent from a DeNB;

an acquiring component 81 is configured to acquire subscription data of the RN from a Home Subscriber Server (HSS);

a determination component 82 is configured to determine whether the RN is a mobile RN according to the identity indication information and/or the subscription data of the RN; and a selection component 83 is configured to select a PGW of a core network as the PGW of the RN when it is determined that the RN is a mobile RN.

Furthermore the determination component 82 is configured:

to judge whether the identity indication information of the RN indicates that the RN is a mobile RN, and if so, to determine that the RN is a mobile RN; otherwise, to determine that the RN is fixed RN.

Furthermore the determination component 82 is configured:

to judge whether the identity indication information of the RN indicates that the RN is a mobile RN and whether there is mobile RN indication information in the subscription data, and if both judge results are positive, to determine that the RN is a mobile RN; otherwise, to determine that the RN is fixed RN.

Furthermore the determination component 82 is configured:

to judge whether there is mobile RN indication information in the subscription data, and if so, to determine that the RN is a mobile RN; otherwise, to determine that the RN is fixed RN.

Furthermore the selection component 83 is configured:

to select a PGW of a core network as the PGW of the RN according to an Access Point Name (APN) in the subscription data or local pre-configuration information or an APN reported from the RN.

Furthermore the selection component 83 is configured:

when there are two APNs in the subscription data, to select one with a specific flag from the two APNs, to inquire a DNS server for information about PGWs according to the selected APN and to select one of the found PGWs as a PGW of the RN, where the specific flag indicates that the APN with the flag is used to select PGWs enabling an RN to operate normally as an evolved Node B; or when there are two APNs in the subscription data, to select one without a specific flag among the two APNs, to inquire a DNS server for information about PGWs according to the selected APN and to select one of the found PGWs as a PGW of the RN, where the specific flag indicates that the APN with the flag is used to select PGWs in connection with an OAM; or when there is one APN in the subscription data, to inquire a DNS server for information about PGWs according to the APN and to select one of the PGWs as the PGW of the RN.

Furthermore the selection component 83 is configured:

when there is an APN of PGWs in the local pre-configuration information, to inquire a DNS server for information about PGWs according to the APN and to select one of the PGWs as the PGW of the RN; or when there an IP address of a PGW in the local pre-configuration information, to select the PGW with the IP address as the PGW of the RN.

Furthermore the selection component 83 is configured:

when the APN reported from the RN is carried in a Non Access Stratum (NAS) message in the Initial UE message, to acquire the APN in the NAS message, to inquire a DNS server for information about PGWs according to the APN and to select one of the PGWs as the PGW of the RN.

Furthermore the MME further includes:

a selection component 84 is configured to select an SGW for the RN according to the geographical location where the RN currently resides and load conditions of respective Serving Gateways (SGWs).

Figure 9:
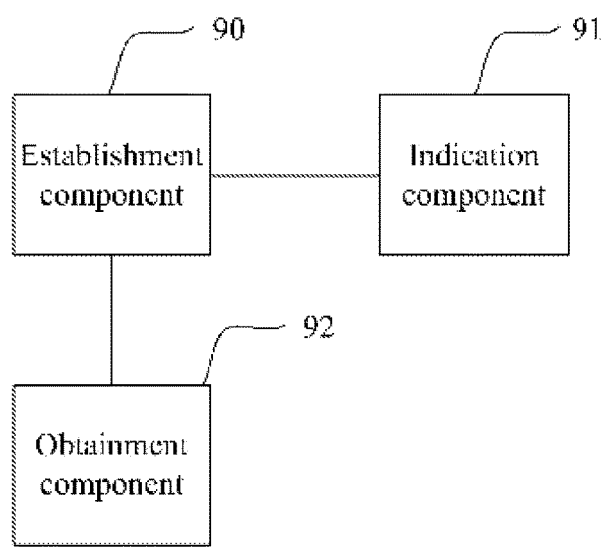
FIG. 9 is a schematic structural diagram of another apparatus according to an embodiment of the invention.

Referring to FIG. 9, an embodiment of the invention further provides a mobile RN including:

an establishment component 90 is configured to establish an RRC connection with a DeNB upon entry into a second phase of startup; and an indication component 91 is configured to send to the DeNB identity indication information indicating the mobile RN as an RN or a mobile RN in the course of establishing an RRC connection.

Furthermore the indication component 91 is configured:

to send to the DeNB the identity indication information indicating the mobile RN as an RN or a mobile RN in an RRC Setup Complete message.

Furthermore the mobile RN further includes:

an obtainment component 92 is configured to download from an OAM, an Access Point Name (APN) referring to PGWs enabling an RN to operate normally as an evolved Node B, or, to acquire locally preconfigured APN referring to PGWs enabling an RN to operate normally as an evolved Node B, before the RRC connection is established with the DeNB; and the indication component 91 is further configured to send the APN to the DeNB in a NAS message while sending the identity indication information indicating the mobile RN as an RN or a mobile RN to the DeNB.

Furthermore the indication component 91 is further configured:

to send the APN to the DeNB in a Non Access Stratum (NAS) message in the RRC Setup Complete message.

Figure 10:
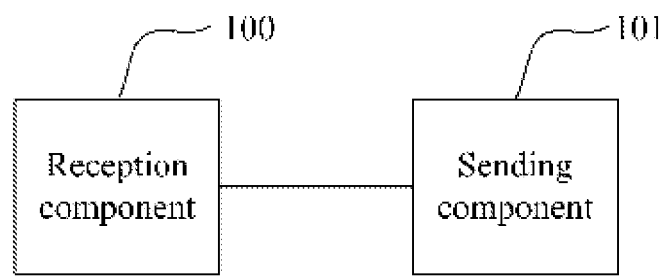
FIG. 10 is a schematic structural diagram of a further apparatus according to an embodiment of the invention.

Referring to FIG. 10, an embodiment of the invention further provides a DeNB including:

a reception component 100 is configured to receive identity indication information, sent from a mobile RN, indicating the mobile RN as an RN or a mobile RN in the course of establishing an RRC connection with the mobile RN; and a sending component 101 is configured to send an Initial UE message, carrying the identity indication information, to an MME.

Furthermore the reception component 100 is configured:

to receive the identity indication information sent from the mobile RN in an RRC Setup Complete message.

Furthermore the reception component 100 is further configured:

to receive an NAS message, carrying an APN, sent from the mobile RN while receiving the identity indication information sent from the mobile RN; and wherein the Initial UE message sent from the sending component 101 further carries the NAS message carrying the APN.

Figure 11:
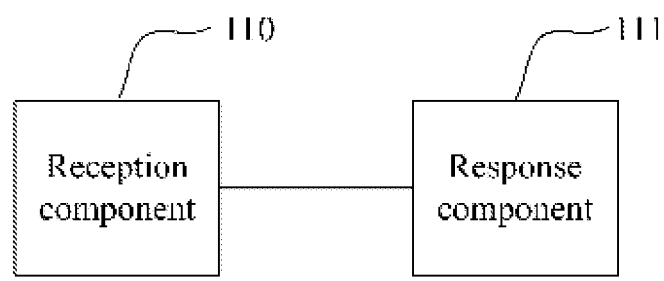
FIG. 11 is a schematic structural diagram of still another apparatus according to an embodiment of the invention.

Referring to FIG. 11, an embodiment of the invention further provides an HSS including:

a reception component 110 is configured to receive a Locate Update Request sent from an MME; and a response component 111 is configured to return subscription data of a mobile RN to the MME, where the subscription data includes mobile RN indication information and/or an Access Point Name (APN) referring to PGWs enabling an RN to operate normally as an evolved Node B.

Furthermore the subscription data returned from the response component 111 further includes an APN referring to PGWs for connection with an OAM; and The APN, returned from the response component 111, referring to PGWs enabling an RN to operate normally as an evolved Node B is provided with a specific flag indicating that the APN with the flag is used to select PGWs enabling an RN to operate normally as an evolved Node B; or the APN referring to PGWs in connection with an Operation and Maintenance (OAM) system is provided with a specific flag indicating that the APN with the flag is used to select PGWs in connection with an OAM.

In summary, advantageous effects of the invention include:

In the solutions according to the embodiments of the invention, a mobile RN establishes an RRC connection with a DeNB upon entry into a second phase of startup and sends to the DeNB identity indication information indicating the mobile RN as an RN or a mobile RN in the course of establishing the RRC connection; the DeNB sends an Initial UE message, carrying the identity indication information, to an MME upon reception of the identity indication information, sent from the mobile RN, indicating the mobile RN as an RN or a mobile RN; and the MME acquires subscription data from an HSS upon reception of the Initial UE message sent from the DeNB, determines whether the RN is a mobile RN according to the identity indication information and/or the subscription data, and if so, then the MME selects a PGW of a core network as a PGW of the RN. Apparently the inventive method enables a solution to selecting a PGW for a mobile RN to thereby address the issue of how to select a PGW for a mobile RN.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the essence and scope of the invention. Thus the invention is also intended to encompass these modifications and variations thereto so long as the modifications and variations come into the scope of the claims appended to the invention and their equivalents.

What is claimed is:

1. A method of selecting a gateway, comprising:
a Mobility Management Entity, MME, receiving an Initial UE message carrying identity indication information of a Relay Node, RN, sent from a Donor evolved Node B, DeNB, and acquiring subscription data of the RN from a Home Subscriber Server, HSS; and
the MME determining whether the RN is a mobile RN according to the identity indication information and/or the subscription data of the RN, and selecting a Packet data Gateway, PGW, located in a core network as the PGW of the RN upon determining that the RN is a mobile RN.

2. The method of claim 1, wherein the MME determining whether the RN is a mobile RN according to the identity indication information of the RN comprises:
the MME judging whether the identity indication information of the RN indicates that the RN is a mobile RN, and if so, then determining that the RN is a mobile RN.

3. The method of claim 1, wherein the MME determining whether the RN is a mobile RN according to the identity indication information and the subscription data of the RN comprises:
the MME judging whether the identity indication information of the RN indicates that the RN is a mobile RN and whether there is mobile RN indication information in the subscription data, and if both results of the judging are positive, then determining that the RN is a mobile RN.

4. The method of claim 1, wherein the MME determining whether the RN is a mobile RN according to the subscription data of the RN comprises:
the MME judging whether there is mobile RN indication information in the subscription data, and if so, then determining that the RN is a mobile RN.

5. The method of claim 1, wherein the selecting a PGW of a core network as a PGW of the RN comprises:
the MME selecting a PGW of a core network as the PGW of the RN according to an Access Point Name, APN, in the subscription data or local pre-configured information or an APN reported from the RN.

6. The method of claim 5, wherein the selecting a PGW of a core network as the PGW of the RN according to an APN in the subscription data comprises:
when there are two APNs in the subscription data, the MME selecting one with a specific flag from the two APNs, inquiring a Domain Name System, DNS, server for PGWs according to the selected APN and selecting one of the PGWs as the PGW of the RN, wherein the specific flag indicates that the APN with the flag is used to select PGWs enabling an RN to operate normally as an evolved Node B; or
when there are two APNs in the subscription data, the MME selecting one without a specific flag from the two APNs, inquiring a DNS server for PGWs according to the selected APN and selecting one of the PGWs as the PGW of the RN, wherein the specific flag indicates that the APN with the flag is used to select PGWs in connection with an OAM; or
when there is one APN in the subscription data, the MME inquiring a DNS server for PGWs according to the APN and selecting one of the PGWs as the PGW of the RN.

7. The method of claim 5, wherein the selecting a PGW of a core network as the PGW of the RN according to the local pre-configured information comprises:
when there is an APN of PGWs in the local pre-configured information, the MME inquiring a DNS server for the PGWs according to the APN and selecting one of the PGWs as the PGW of the RN; or
when there are an IP address of a PGW in the local pre-configured information, the MME selecting the PGW with the IP address as the PGW of the RN.

8. A method of indicating an identity, comprising:
a mobile Relay Node, RN, sending to a Donor evolved Node B, DeNB, identity indication information indicating itself as an RN or a mobile RN in the course of establishing a Radio Resource Control, RRC, connection with the DeNB during second phase, so that a Mobility Management Entity, MME, receives an Initial UE message carrying identity indication information of the RN sent from the DeNB and acquires subscription data of the RN from a Home Subscriber Server, HSS; and determines whether the RN is a mobile RN according to the identity indication information and/or the subscription data of the RN, and selects a Packet data Gateway, PGW, located in a core network as the PGW of the RN upon determining that the RN is a mobile RN.

9. The method of claim 8, wherein before the mobile RN establishes the RRC connection with the DeNB, the method further comprises: the mobile RN downloading from an Operation and Maintenance, OAM, system, an Access Point Name, APN, referring to PGWs enabling an RN to operate normally as an evolved Node B; or the mobile RN acquiring a locally preconfigured APN referring to PGWs enabling an RN to operate normally as an evolved Node B; and
the mobile RN sending the APN to the DeNB in a Non Access Stratum, NAS, message while sending the identity indication information indicating itself as an RN or a mobile RN to the DeNB.

10. A method of forwarding an identity indicator, comprising:
a Donor evolved Node B, DeNB, receiving identity indication information, sent from a mobile Relay Node, RN, indicating it as an RN or a mobile RN in the course of establishing a Radio Resource Control, RRC, connection with the mobile RN; and
the DeNB sending an Initial UE message, carrying the identity indication information, to a Mobility Management Entity, MME, so that the MME receives the Initial UE message and acquires subscription data of the RN from a Home Subscriber Server, HSS; and determines whether the RN is a mobile RN according to the identity indication information and/or the subscription data of the RN, and selects a Packet data Gateway, PGW, located in a core network as the PGW of the RN upon determining that the RN is a mobile RN.

11. The method of claim 10, further comprising: the DeNB receiving an NAS message, carrying an APN, sent from the mobile RN while receiving the identity indication information sent from the mobile RN; and
wherein the Initial UE message further carries the NAS message carrying the APN.

* * * * *